(12) United States Patent
Amafuji et al.

(10) Patent No.: US 6,771,424 B1
(45) Date of Patent: Aug. 3, 2004

(54) HEAD-MOUNTED DISPLAY DEVICE

(75) Inventors: Hisashi Amafuji, Kyoto (JP); Keizo Kumai, Nagaokakyou (JP); Tetsuya Kishida, Matsubara (JP); Yoshio Kakuta, Kobe (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/638,029

(22) Filed: Aug. 15, 2000

(30) Foreign Application Priority Data

Aug. 31, 1999 (JP) ............................................ 11-246361
Feb. 18, 2000 (JP) ........................................ 2000-040639
May 12, 2000 (JP) ........................................ 2000-139879

(51) Int. Cl.[7] ............................ G02B 27/14; G09G 5/00; H04N 7/00
(52) U.S. Cl. ........................... 359/632; 359/630; 345/7; 345/8; 345/53; 348/115
(58) Field of Search ................................. 359/630, 631, 359/632; 345/7, 8, 9, 13, 14, 42, 53; 348/115

(56) References Cited

U.S. PATENT DOCUMENTS 5,815,126 A * 9/1998 Fan et al. ...................... 345/8
6,034,029 A * 3/2000 Robertson et al. ............. 345/8
6,378,390 B2 * 4/2002 Saito ............................ 74/159

FOREIGN PATENT DOCUMENTS

JP 09318905 12/1997
JP 10123452 5/1998

* cited by examiner

Primary Examiner—Loha Ben
(74) Attorney, Agent, or Firm—Rader, Fishman & Grauer PLLC

(57) ABSTRACT

The present invention is a head-mounted display device comprising a head holding holder that is proximate at least to the two sides of the head and to the front of the head, and a display unit that is deployed on that holder, at a position over either the left or right eye at the front of the head.

13 Claims, 8 Drawing Sheets

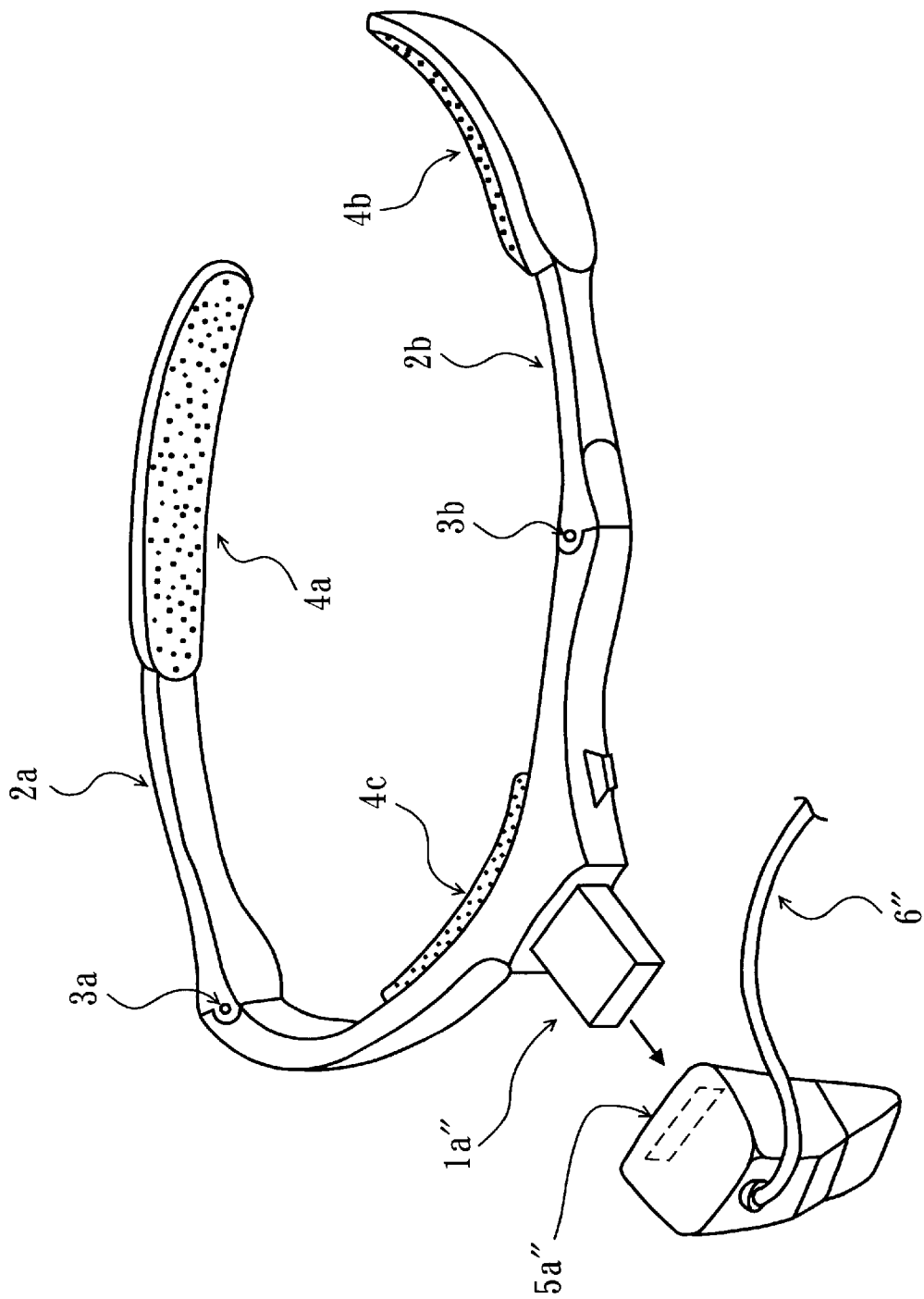

HEAD-MOUNTED DISPLAY DEVICE

FIELD OF THE INVENTION

This invention relates to a head-mounted display device for visually recognizing images output from personal computers, television images, and images displayed by display devices for performing various kinds of work, which is mounted on the head as a wearable personal computer display device, for example.

DESCRIPTION OF RELATED ART

In recent years, information devices typified by the wearable personal computer, which mounts computer functions on the human body, are being practically implemented. These devices function as auxiliary equipment when performing complex work or making decisions requiring sophisticated knowledge at the job site. By using the head-mounted display device as a monitor for such wearable personal computers, the images on that monitor can be visually recognized while working on the job.

Such a head-mounted display device is known that has a structure wherein a display unit comprising a display deployed at the side of the head or above or below the eyeballs and a non-spherical reflecting optical system for causing the images displayed on that display to be visually recognized is fixed to the head by a headphone type mounting unit.

There is a problem with the conventional head-mounted display device in that the display unit, being large, places a burden on the user. The conventional scheme proposed for resolving this problem is to provide an arm that sticks out to the side in a holder that extends from the sides of the head to the back of the head, and then secure the display unit to that arm. Based on this scheme it is possible to make the holder and the display smaller.

However, with this conventional scheme, the interval between the display device and the eyes becomes great to some extent because the display unit is secured to the arm that protrudes from the side of the holder. This entails a problem in that the display unit becomes large when the visual field angle is made large. When a small, lightweight display unit is used in this conventional scheme, it is very difficult to visually recognize the small details of sophisticated personal computer output images (such as color SVGA images having a resolution of 800×600 dots, for example).

Also, when the conventional scheme is applied to a monocular head-mounted display device having a single display, the position of the display unit must be changed from left to right or right to left according to the user's needs (i.e., according to which side the vision of the user is better on, whether the user is right-sighted or left-sighted, user preference, etc.). For that reason, it is necessary to temporarily remove the display unit from the holder, invert the holder, and reattach the display unit to the holder. Because the display unit is fastened to the holder by screws or the like, one must use a screwdriver or similar tool to detach and reattach the display unit. Thus it is not possible for a user to frequently change the display unit back and forth between the right and left sides according to his or her preference, etc., making the utility of the device very poor. In short, what is needed is a configuration wherewith the display unit can be stably held in place and the position of the display unit can easily be changed between left and right. Furthermore, because there are great personal differences between users in terms of facial shape (such as the shape of the eye sockets and the slope of the forehead), a configuration is also necessary wherewith the position of the display unit can be adjusted fore and aft in order to optimally adjust the interval between the eyeballs and the display unit.

An object of the present invention is to provide a head-mounted display device wherewith a visual field angle can be secured that will enable adequate recognition of display image information, wherewith the user can freely choose which eye to use to visually recognize the display image, wherewith the display unit can be easily positioned for optimum visual recognition of the display image, and wherewith the display unit can be easily attached and detached.

SUMMARY OF THE INVENTION

The head-mounted display device of the present invention comprises: a head holding holder that is proximate at least to both sides of the head and the front of the head; and a display unit deployed on the holder at a position above the eye either on the left or the right side, at the front of the head.

It is preferable that the holder is capable of being used inverted.

It is preferable that the holder has a shape capable of preventing head holding force thereof from becoming unbalanced to the left or the right.

By preventing the head holding force of this holder from becoming unbalanced to the left or right, the holding force acting on the head of the user from the left side and the holding force acting thereon from the right side become roughly the same. Thus, even when the holder is inverted, differences in the holding force acting from the left thereof and the holding force acting from the right thereof that are sensible to the user can be prevented from occurring. The holding force acting from the left side and the holding force acting from the right side need only be roughly the same, to such an extent that the user will not sense a difference in left and right holding force.

There is no particular limitation on the shape of the holder, and it need only contact at least the two sides of the head and the front of the head. That shape can be a U shape as in a head band or hair band, for example, or it can be ring shaped. The parts of the holder that are proximate to the head are not limited to those parts proximate to the two sides of the head and the front of the head; there can also be a part proximate to the crown of the head, in which case a cap shape, for example, can be adopted as the shape of the holder.

The shape of the holder is not limited to one that is laterally symmetrical. When the holder weight is laterally asymmetrical, for example, the shapes of the parts of the holder proximate to the front of the head and to two sides of the head can be mutually different so that the holding force acting on the head of the user from the left side is roughly the same as the holding force acting thereon from the right side.

By the holder being "proximate" to the head, in the present invention, is meant not only cases where the holder makes direct contact with the two sides of the head and the front of the head, but also cases where it makes indirect contact therewith through an intermediate material such as a head protecting member (described subsequently), for example.

The holder can be configured by a single member. Alternatively, the holder can be divided between a member that is proximate to one side of the head, a member that is proximate to the other side of the head, and a member that is proximate to the front of the head, with a hinge structure both between the member proximate to the front of the head and the member proximate to the one side of the head and between the member proximate to the front of the head and the member proximate to the other side of the head.

A head protecting member can be provided on the holder at an area near the front of the head and/or at a part of area extending from the sides of the head to the back of the head. Such a head protecting member can consist of a so-called pad or other shock absorbing material. The material of the head protecting member can be anything that exhibits elasticity, such as a urethane sponge, elastomer, or rubber. This head protecting member can be made either integrally with the holder or separately therefrom.

The display unit is configured by a display that creates at least a display image and a reflecting optical member having a reflecting surface that reflects display light output from the display. A liquid crystal display device, plasma display, or small CRT display or the like can be used for this display, but such does not constitute a limitation. The liquid crystal display device can be either a transmitting type or reflecting type. The light source therefor can be either a surface light source or a point light source, and a LED, halogen bulb, or cold cathode tube, etc., can be used, for example.

The reflecting optical member can be configured by combining a full reflecting mirror, half mirror, and/or prism or the like.

Inside the display unit, drive means such as a circuit board for receiving signals from an external signal source and driving the display device can be comprised. That circuit board can also be provided separately from the display unit.

The display unit is attachable in a position either on the left or the right of the holder, on the side at the front of the head, in a position above the eye of the user. Thus the display device unit hangs down from the vicinity of one of the eyebrows, and so approaches near to the eyeball. Thus, even if the display unit is small, it can be securely held so that it poses but a small obstacle in the field of view, so that a suitable visual field angle can be guaranteed. By the "position above the eye" wherein this display unit should be deployed is signified a position wherewith the light emitted from the display unit subtends an angle of 0 to ±45 degrees, in the vertical direction, with the horizontal plane that contains the line of sight of the user to the front, and wherein the emitted light subtends an angle of 0 to ±60 degrees, in the lateral direction, with the vertical plane that includes the line of sight of the user toward the front.

The display unit is attached to the holder so that it can be inverted. It is preferable that the attachment of the display unit to the holder is done so that attachment and detachment are easy. For example, a display unit holding guide is provided in the holder and making the display unit capable of sliding relative to such guide. There is no limitation to such a configuration, however, and the display unit can be attached to the holder with screws or the like.

Alternatively, it is preferable that parts for mutually joining the display unit and the holder each have a vertically symmetrical shape. Or, a display unit holding guide can be provided in the holder and the display unit made so that it can turn about an axis oriented in a direction in which the guide protrudes. In that case, a configuration can be implemented wherein a cutout is made in the guide so that the display unit can be inverted relative to the holder when it is positioned near the tip of the guide. The position of the display unit can be switched from left to right or right to left, by inverting the display unit relative to the holder and then inverting the holder relative to the user.

In the head-mounted display device of the present invention, it is preferable that left to right movement means, up and down movement means, and fore and aft movement means be provided so that the display unit described in the foregoing can be adjustably moved left and right, up and down, and fore and aft relative to the holder described in the foregoing.

The holder can consist, for example, of a holding cover for holding the display unit and a frame for supporting the holding cover. Guide channels can be formed in the holding cover for the up and down movement means. The frame can have a shape that is vertically symmetrical.

It is preferable that the left and right movement means, up and down movement means, and fore and aft movement means have a shaft-shaped guide structure respectively. A preferable structure for up and down movement means having such a shaft-shaped guide structure is one wherein the display unit is linked via a pin to the holding cover described above, which pins are made movable along a guide channel in the holding cover, but this does not constitute a limitation. The left and right movement means can be such that the display unit is held so that it can turn about the shaft of the shaft-shaped guide structure. For example, a structure is conceivable wherein a guide shaft is provided in the frame described above, the display unit is attached to that guide shaft, either directly or indirectly through the holding cover, and the display unit is made moveable to the left and right along that guide shaft, but this poses no limitation. A structure is conceivable for the fore and aft movement means wherein, for example, a fore and aft guide plate extending in the fore and aft directions are provided in a left and right guide shaft, and the display unit is moved along the fore and aft guide plate, either directly or integrally with the holding cover, but this poses no limitation.

When the display unit does not come into the visual field angle of the user, the position of the display unit is finely adjusted by the left and right movement means, up and down movement means, and fore and aft movement means. The amount of movement induced in the display unit by those left and right movement means, up and down movement means, and fore and aft movement means is preferably from 0 to ±10 mm in the left and right direction, 0 to ±10 mm in the up and down direction, and 0 to ±10 mm in the fore and aft direction. When the position of the display unit is adjusted so as to exceed these movement amounts, the adjustment is made by moving the holder itself.

The display unit is positionally adjusted in the yaw direction, roll direction, and pitch direction by moving the holder relative to the head.

It is preferable that the left and right movement means, up and down movement means, and fore and aft movement means have movement guidance mating parts, respectively, and that the display unit described above has a play to move slightly relative to the holder in at least one of those movement guidance mating parts. Thus the position of the display unit can be finely adjusted in the yaw direction, roll direction, and pitch direction. In the up and down movement means having the shaft-shaped guide structure described above, the guide channel described above correspond to the movement guidance mating part.

It is preferable that the left and right movement means have a shaft-shaped guide structure, and display retraction means are provided for holding the display unit so that the display unit can turn about a shaft of that shaft-shaped guide structure, or for holding the display unit so that the display unit is moveable to the left and right along the shaft of that shaft-shaped guide structure. The amount of the turning or left and right movement of the display unit is determined so that the display unit can be removed from the field of view of the user.

It is preferable, in the head-mounted display device of the present invention, that display unit attachment and detachment means be provided for attaching and detaching the holder to and from the display unit without using any tools.

The display unit attachment and detachment means are for attaching and detaching the display unit to and from the holder without using any tools. By "not using any tools" is meant that the display unit can be attached and detached by hand, without using a screw driver or other tightening tool. More specifically, it is preferable that the display unit attachment and detachment means have a dial wherewith a turning manipulation is possible, such that the display unit can be attached to and detached from the holder by turning manipulation with that dial. It is preferable that the dial be knurled about its outer circumference. The display unit can also be attached to and detached from the holder by using a spring, a slide channel, etc.

The display device of the present invention can be used for displaying job content at manufacturing plants or assembly plants for various kinds of products, for displaying English conversation or other educational information, and for displaying items on display at tourist attractions, historic sites, aquariums, botanical gardens, or showrooms, etc.

According to the present invention, a head-mounted display device can be realized wherewith images can be visually recognized at a practical level of display viewing range angle, with small size and light weight, with ease of mounting, and with either the left or right eye, wherewith the display position can be easily adjusted for optimum visual recognition, wherewith the display unit can be positionally adjusted up and down, to the left and right, and fore and aft, with a simple configuration, wherewith the display unit can be retracted beyond the range of the field of view when not being used, and wherewith the display unit can be easily attached and detached simply by turning a dial, without using any special tools.

BRIEF DESCRIPTION OF THE DRAWINGS

FIG. 8 is an exploded diagonal view of the head-mounted display device in the third embodiment of the present invention.

DETAILED DESCRIPTION OF PREFERRED EMBODIMENTS

Figure 1:
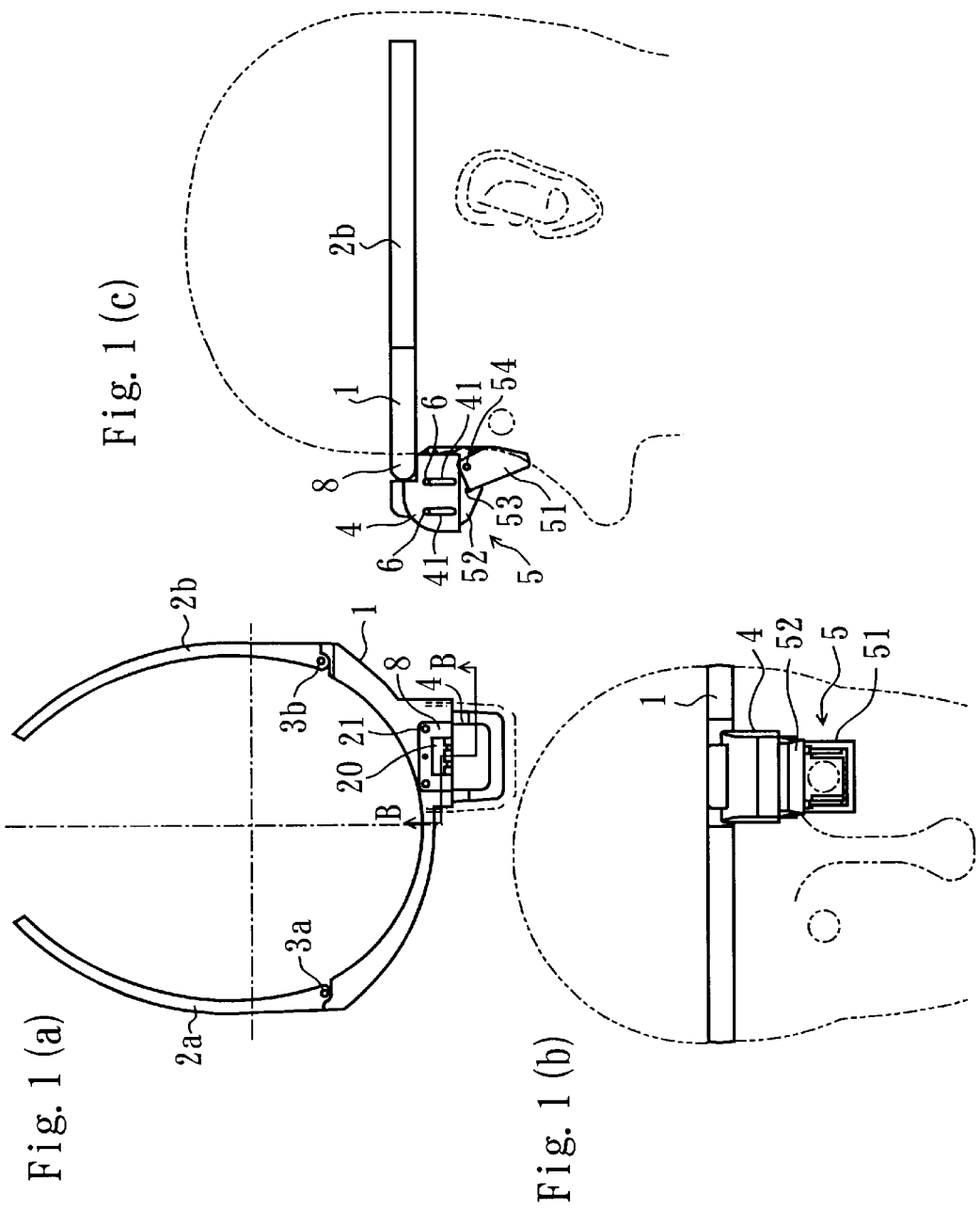
FIG. 1(a) is a plan of a head-mounted display device in a first embodiment of the present invention.
FIG. 1(b) is a front elevation of that head-mounted display device.
FIG. 1(c) is a side elevation of that head-mounted display device.

External views of a head-mounted display device in a first embodiment of the present invention are given in FIGS. 1(a) to 1(c). FIG. 1(a) is a plan, FIG. 1(b) is a front elevation, and FIG. 1(c) is a side elevation.

In these figures, item 1 is a front frame that is proximate to the front of the head. Side frames 2a and 2b that are proximate to the sides of the head are attached by hinges 3a and 3b to the two ends of the front frame 1. When the side frames 2a and 2b are opened roughly to the condition diagrammed relative to the front frame 1 by the hinges 3a and 3b, the side frames 2a and 2b come in contact with projections in the front frame 1 so that they do not open beyond that. The axial directions of the turning axes of those hinges 3a and 3b are oriented in an up and down direction during mounting to the head. The front frame 1 and the side frames 2a and 2b correspond to the head holding holder of the present invention.

To the front frame 1, a display unit 5 is attached, by an up and down guide cover 4, at a position above either the left or right eye of the user (shown above the left eye in this embodiment).

Pins 6 provided in the display unit 5 fit into guide channels 41 provided in the up and down guide cover 4. By designing the diameters of those guide channels 41 to be slightly larger than the outer diameters of the pins 6, so-called play can be imparted. Thus, while the pins 6 move linearly along the guide channels 41, they can also move slightly in the pitch direction in that position. These guide channels 41 constitute movement guidance mating parts.

The display unit 5 is configured by an optical system 51 consisting of a combiner having a beam splitter function and a half mirror, and by a display 52 having a beam splitter exhibiting a light polarizing function, a light source, a polarizing plate, and a reflecting liquid crystal element. A cable for sending signals to the interior of the display unit 5 is not shown in the diagram. For linking the optical system 51 and the display 52, a pin 54 is provided in the optical system 51, which pin 54 is fit into a channel 53 in the display 52 to secure the optical system 51 to the display 52. Configuration within the display unit 5 is described later.

Item 8 in FIG. 1(a) is a covering lid. A cutout 20 is formed in one part of that covering lid 8, and a fore and aft guide plate 9 turns about a left and right guide shaft 7 (described subsequently) inside the covering lid 8. This covering lid 8 is attached to the front frame 1 by a screw 21 so that it can be inverted, and an up and down guide cover 4 is attached, as described subsequently, to the guide plate 9 that is attached to the guide shaft 7, whereby the display unit 5 attached to that up and down guide cover 4 is attached to the holder so that it can be inverted.

Figure 2:
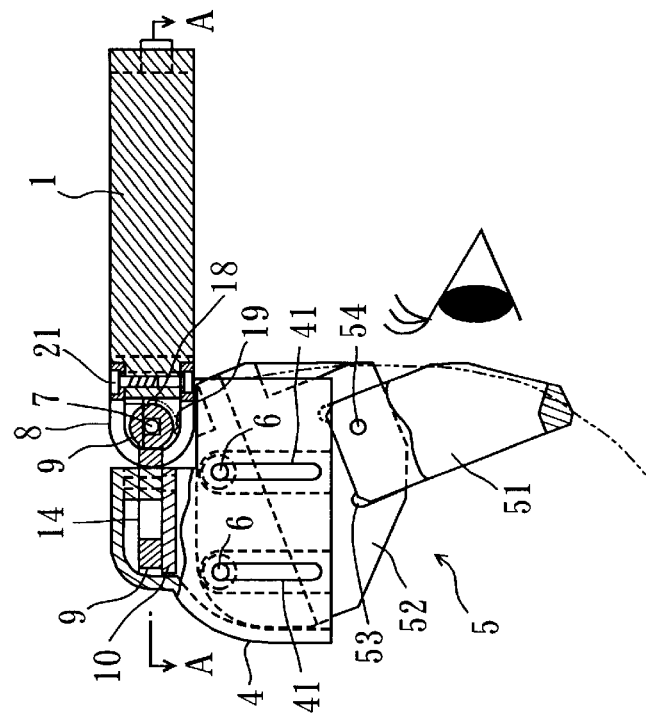
FIG. 2(a) is a cross-sectional plan of the main parts of the head-mounted display device in the first embodiment of the present invention.
FIG. 2(b) is a cross-sectional front elevation thereof.
FIG. 2(c) is a cross-sectional side elevation thereof.
Figure 2:
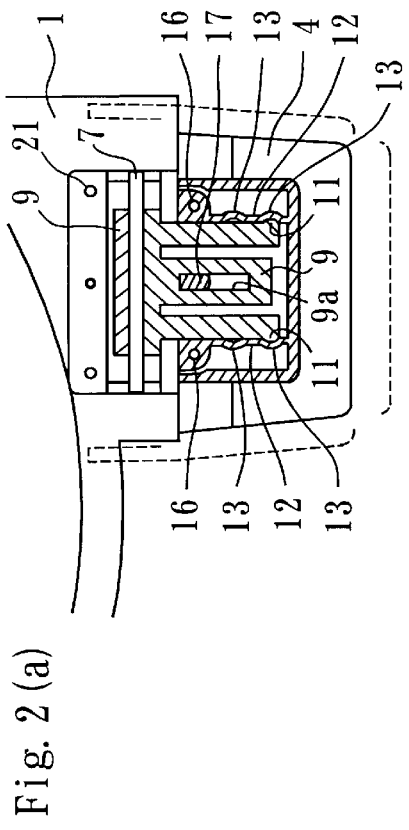
Figure 2:
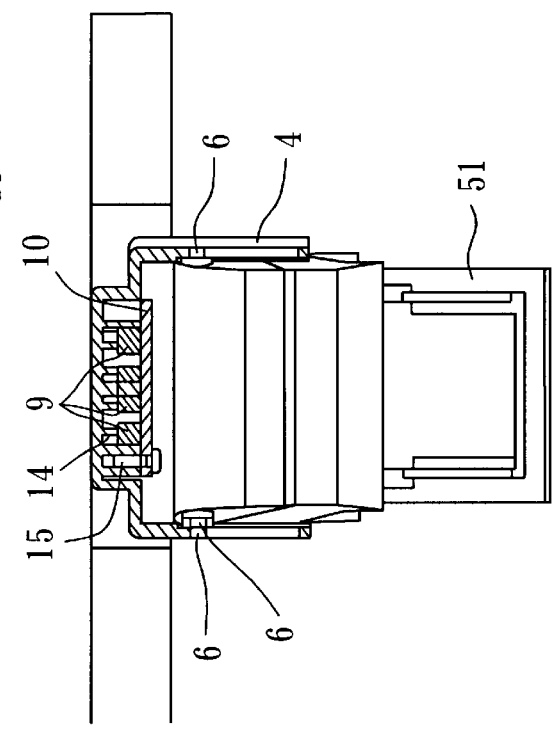

The internal structure of the head-mounted display device diagrammed in FIG. 1 is diagrammed in FIG. 2. FIG. 2(a) is a cross section at the A—A line in FIG. 2(c), FIG. 2(b) is a cross section at the B—B line in FIG. 1(a), and FIG. 2(c) is a cross-sectional side elevation of the device diagrammed in FIG. 1.

In FIG. 2, item 7 is a left and right guide shaft. The comb-shaped fore and aft guide plate 9 is mated to this shaft 7. By designing the fore and aft guide plate 9 to have a slightly larger inner diameter than the outer diameter of the left and right guide shaft 7, so-called play can be imparted. Thus the fore and aft guide plate 9 not only moves linearly along the left and right guide shaft 7, but at that position also moves slightly in the roll direction. That shaft 7 configures a shaft-shaped guide structure. A through hole 9a in that fore and aft guide plate 9 constitutes a movement guidance mating part.

Convexities 11 are made in the front edge of the fore and aft guide plate 9. These convexities 11 mate in fore and aft positioning concavities 13 in the guide plate 12 of the up and down guide cover 4. The fore and aft positioning concavities 13 constitute movement guidance mating parts. A total of two pairs of these fore and aft positioning concavities 13 are provided, one pair in each of two fore and aft positions. Accordingly, when the up and down guide cover 4 moves forward or backward along the fore and aft guide plate 9, it is positionally determined at the two positions.

As diagrammed in FIG. 2(b) and FIG. 2(c), the fore and aft guide plate 9 is sandwiched between a pressure plate 10 and a retainer 14. The pressure plate 10 is secured by a boss 15.

Item 17 in FIG. 2(a) is a catch for the up and down guide cover 4 and item 16 is a boss hole for the boss 15. The catch 17 is inserted into the through hole 9a of the fore and aft guide plate 9. That through hole 9a is designed to be slightly larger than the catch 17, and so-called play can be imparted thereto. Thus the up and down guide cover 4 also moves slightly in the yaw direction in that position.

As diagrammed in FIG. 2(c), and as described earlier, the left and right guide shaft 7 is accommodated inside the covering lid 8. That covering lid 8 has a cutout 20 in the upper surface thereof. At the position of that cutout 20, the fore and aft guide plate 9 and the up and down guide cover 4 that is made integrally with that fore and aft guide plate 9 are able to turn clockwise in FIG. 2(c), about the center of the left and right guide shaft 7. A projection 18 is provided in the fore and aft guide plate 9. This projection 18 fits into a stopper 19 provided on the inner circumference on the bottom surface of the covering lid 8, whereby the turning thereof is limited.

The linkage between the front frame 1 and the cover 8 is done by the screw 21, as described earlier, and the linkage can be released by removing the screw. The front frame 1 has a structure that is vertically symmetrical. The head holding holder is made so that it can be inverted, whereupon it can be switched between left eye use and right eye use by being inverted. This holder has a shape wherewith the head holding forces produced thereby can be prevented from becoming unbalanced to the left or right. When the display unit 5 is attached to the front frame 1, for example, the front frame 1 becomes laterally symmetrical. That being so, if the two side frames 2a and 2b have identical shapes, the holding forces pressing on the two sides of the head will become laterally unbalanced, and, as a consequence, the user will sense a difference in holding force when the holder is used inverted. To counter this problem, a scheme wherein the side frames 2a and 2b have different cross-sectional shapes is adopted in this embodiment. Alternatively, the front frame 1 can be made laterally unsymmetrical. In the case diagrammed, it is necessary to make the rigidity of the side frame 2b less than that of the side frame 2a, wherefore the cross-sectional area of the side frame 2b is made smaller than that of the side frame 2a.

Figure 3:
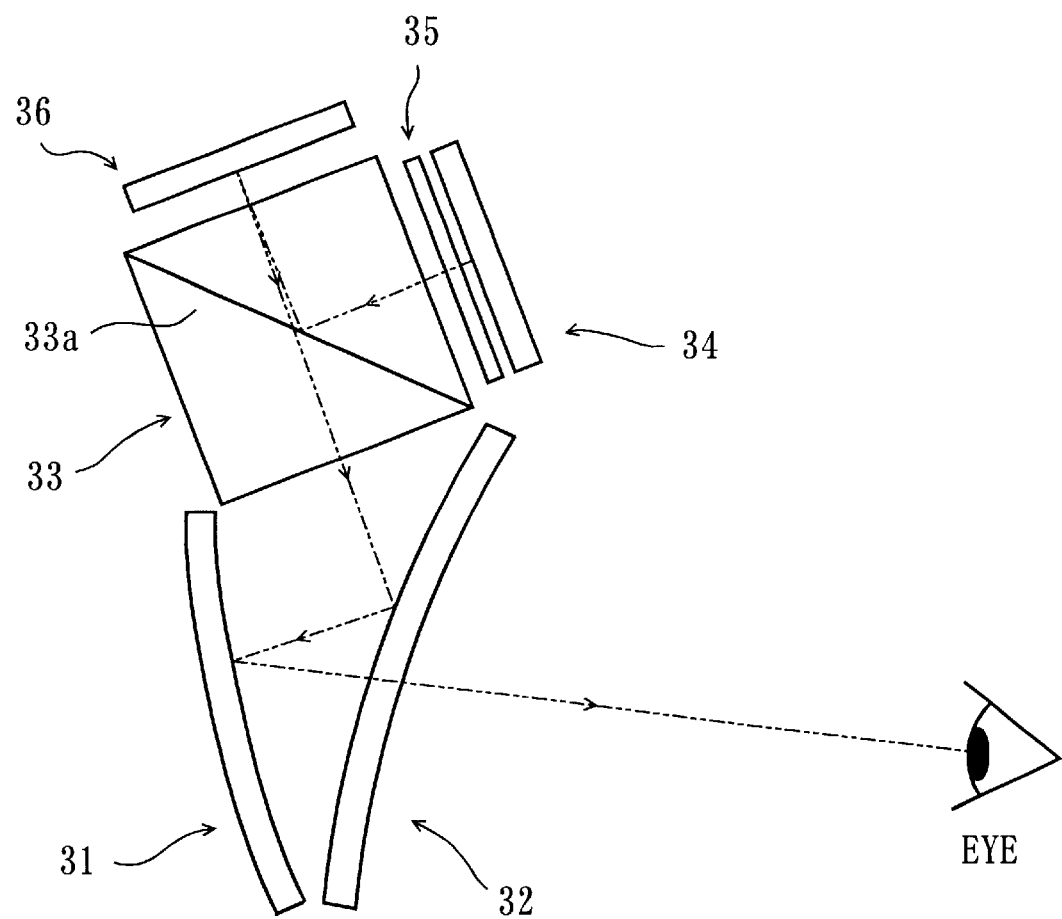
FIG. 3 is a diagram of the internal structure of a display unit.

The internal structure of the display unit 5 is diagrammed in FIG. 3. The optical system 51 of the display unit 5 is configured by a combiner 31 that functions as a beam splitter and by a half mirror 32. The display 52 is configured by a beam splitter 33 that has a light polarizing function, a light source 34, a polarizing plate 35, and a reflecting liquid crystal element 36. The light (indicated by double-dotted line in FIG. 3) output from the light source 34 is transmitted through the polarizing plate 35, light of the S polarized light component is extracted, and that is input to the beam splitter 33. The beam splitter 33 has a reflective transmissive surface 33a that is highly reflective for light of the S polarized light component but highly transmissive for light of the P polarized light component. Light of the S polarized light component that is input to the beam splitter 33 is reflected by the reflective transmissive surface 33a and then input to the reflecting liquid crystal element 36. The input light of the S polarized light component is output from the reflecting liquid crystal element 36 as image display light of the P polarized light component. The light of the P polarized light component output from the reflecting liquid crystal element 36 is transmitted through the reflective transmissive surface 33a, reflected by the half mirror 32, then reflected by the combiner 31, transmitted through the half mirror 32, and directed to the eye of the user as the image display light.

Although not shown in the diagram, there is also accommodated inside the display unit 5 a drive circuit for driving the reflecting liquid crystal element 36 and the light source 34 by signals sent over a cable from an external signal source.

With the configuration described in the foregoing, left and right, up and down, and fore and aft adjusting movements and the retracting of the display unit are performed as described below.

When the user moves the up and down guide cover 4 to the left or right, the up and down guide cover 4 and the fore and aft guide plate 9 move left or right along the left and right guide shaft 7 because the fore and aft positioning concavities 13 are mated with the convexities 11 in the fore and aft guide plate 9.

When the up and down guide cover 4 is moved forward or backward, the guide plate 12 of the up and down guide cover 4 moves forward or backward along the fore and aft guide plate 9. That movement stops at the position where the next fore and aft positioning concavities 13 mates with the convexities 11 in the fore and aft guide plate 9.

When the display unit 5 is moved up or down, the pins 6 move up or down along the guide channels 41, wherefore the display unit 5 also moves up or down.

The broken lines in FIG. 1(a) and FIG. 2(a) represent the left and right and the fore and aft movement tracks of the display unit.

In order to retract the display unit, the up and down guide cover 4 is flipped upward. When that is done, at the position of the cutout in the covering lid 8, the fore and aft guide plate 9 mated in the up and down guide cover 4 turns about the left and right guide shaft 7, wherefore the display unit 5 will flip up until the projection 18 in the fore and aft guide plate 9 fits into the stopper 19. Thus display retraction means are configured.

For adjustments in the yaw, roll, and pitch directions, the user can move the display unit 5 to make adjustments in those various directions because of the play imparted between the pins 6 and the guide channels 41, etc.

Figure 4:
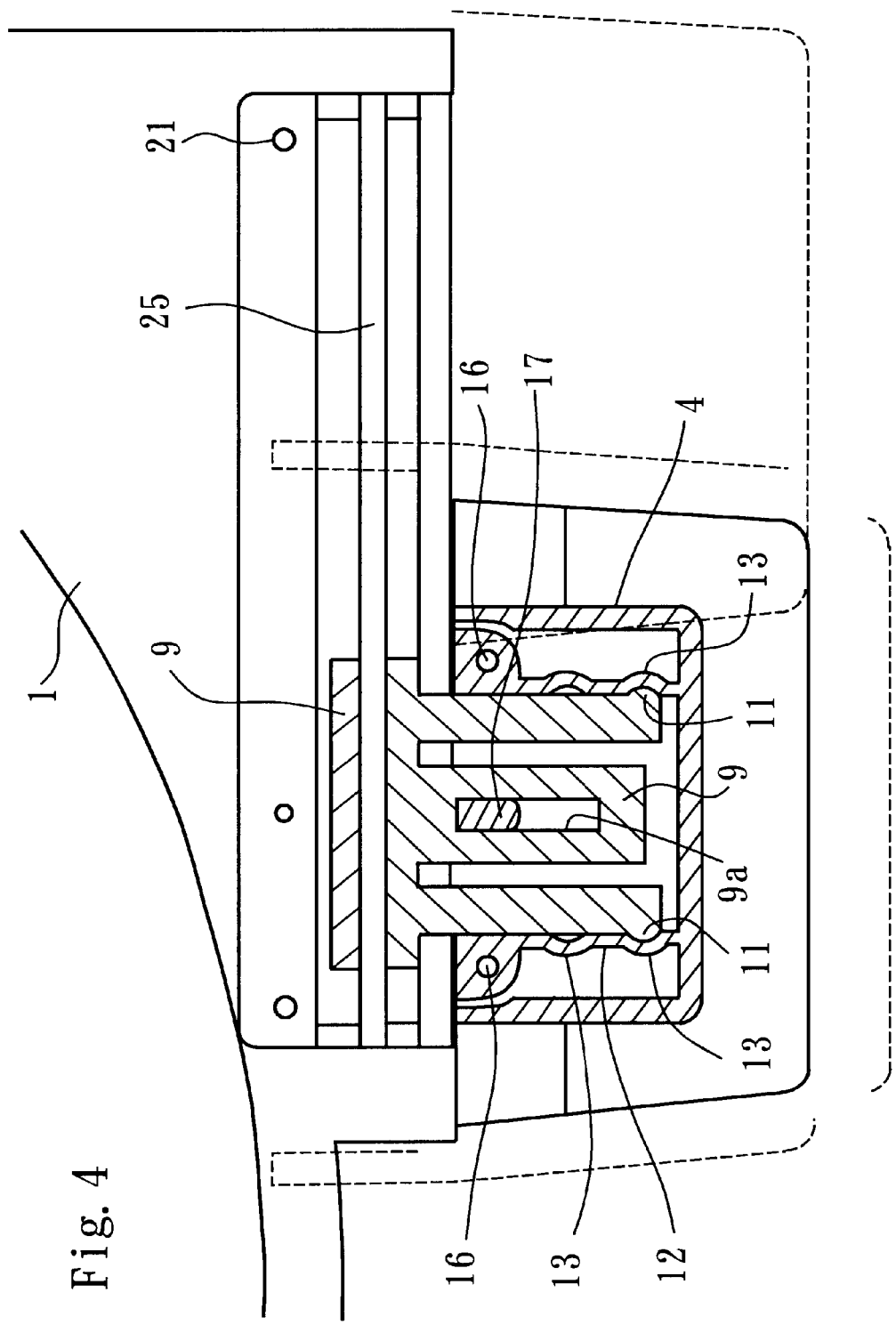
FIG. 4 is a cross-sectional plan of the main parts of a modification example of the head-mounted display device in the first embodiment of the present invention.

A modification example of the first embodiment is diagrammed in FIG. 4. Items in the device diagrammed in FIG.

4 that are the same as those diagrammed in FIG. 2 are indicated by the same numbers. The difference from the device diagrammed in FIG. 2 relates to the retraction of the display unit.

FIG. 4 is a cross-sectional plan, the same as FIG. 2(a). In the configuration diagrammed in FIG. 4, as compared to the configuration diagrammed in FIG. 2, a left and right guide shaft 25 is extended out beyond the field of view, and the fore and aft guide plate 9 is not allowed to turn about the center of the left and right guide shaft 25. In the configuration diagrammed in FIG. 4, the fore and aft positioning concavities 13 in the guide plate 12 of the up and down guide cover 4 are mated with projections 11 in the fore and aft guide plate 9. Accordingly, when the user moves the up and down guide cover 4 to the right, the up and down guide cover 4 and the fore and aft guide plate 9 move to the right along the left and right guide shaft 25 until outside of the field of view of the user. Therefore, as based on this configuration diagrammed in FIG. 4, the display unit can be retracted beyond the field of view without turning the fore and aft guide plate 9 about the center of the left and right guide shaft 25.

The left and right, fore and aft, and up and down movement tracks in FIG. 4 are also represented by broken lines as in FIG. 2(a).

Figure 5:
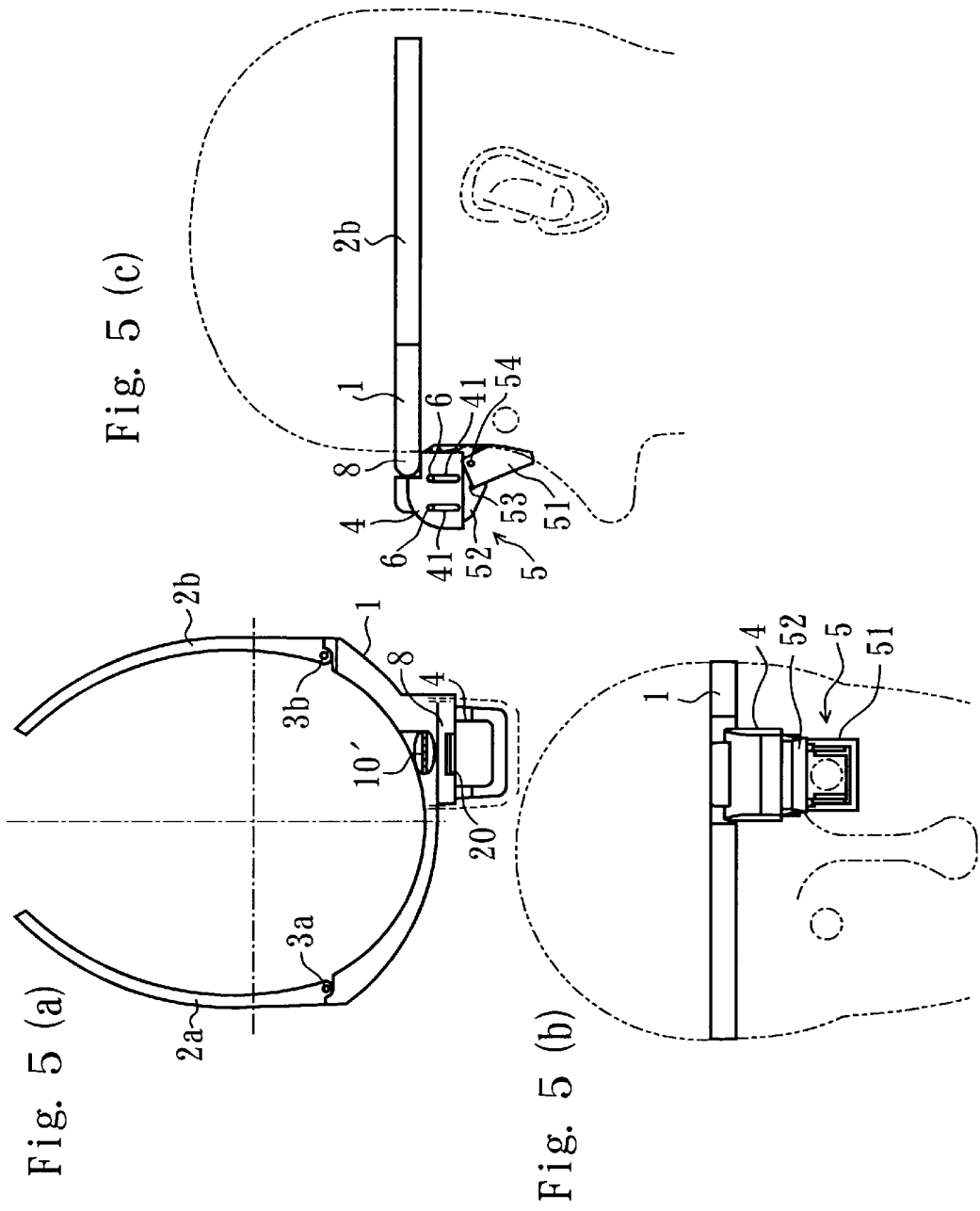
FIG. 5(a) is a plan of a head-mounted display device in a second embodiment of the present invention.
FIG. 5(b) is a front elevation of that head-mounted display device.
FIG. 5(c) is a side elevation of that head-mounted display device.

In FIG. 5 are given external views of a head-mounted display device according to a second embodiment of the present invention. FIG. 5(a) is a plan, FIG. 5(b) is a front elevation, and FIG. 5(c) is a side elevation. Parts that are the same as in the first embodiment are indicated by the same symbols, and only the points of difference are described.

Figure 6:
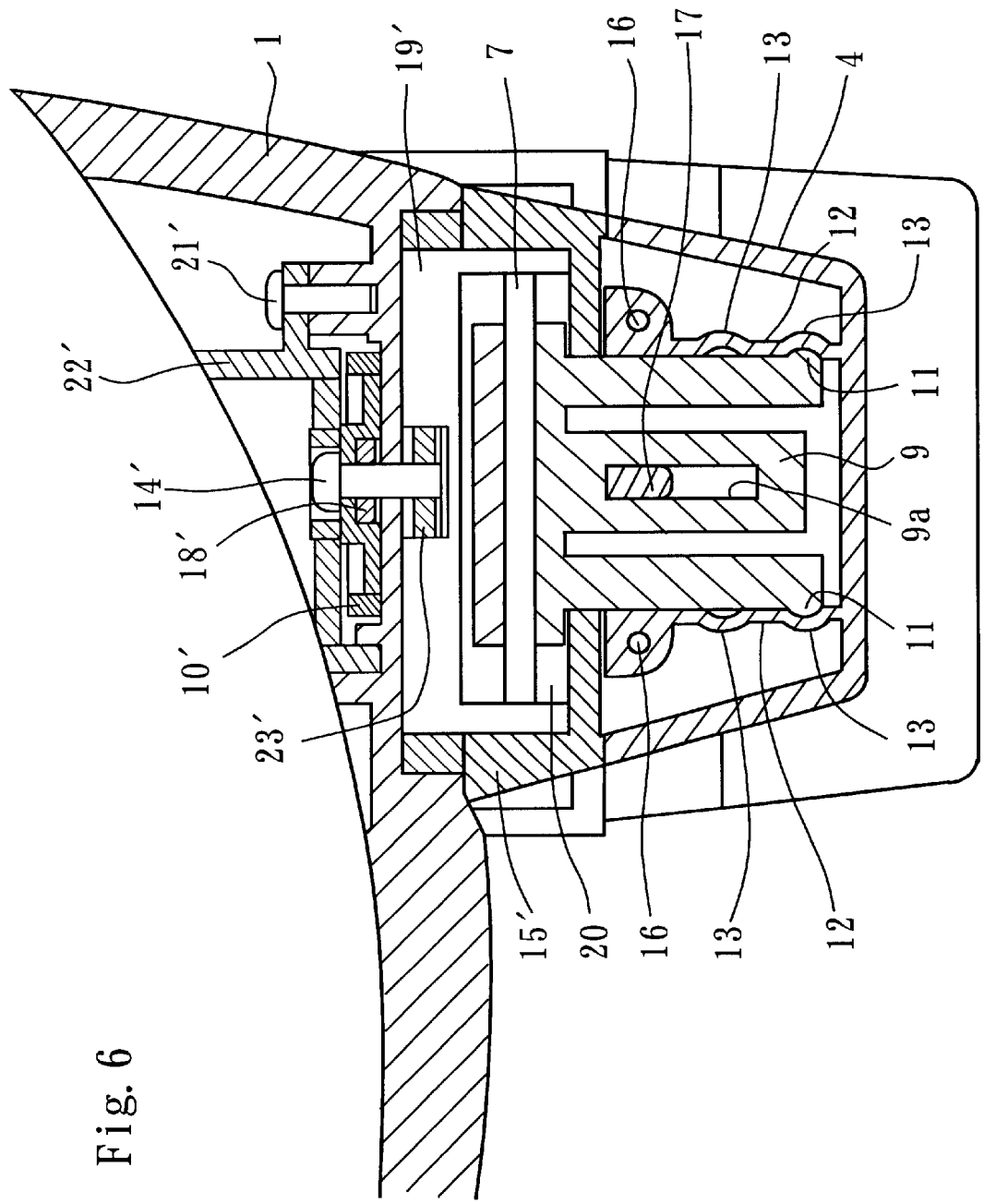
FIG. 6 is a cross-sectional plan of the head-mounted display device in the second embodiment of the present invention.

In this second embodiment, a dial 10' capable of a turning manipulation is accommodated in the cutout provided in the front frame 1. The outer circumference of this dial 10' is knurled. As described subsequently, by turning this dial 10', the up and down guide cover 4 and the display unit 5 can be attached to and detached from the front frame 1 without using tools. FIG. 6 is a cross-sectional plan of the device diagrammed in FIG. 5(a). In FIG. 6, a left and right guide shaft 7 is accommodated inside a supporting member 15' that is covered by the covering lid 8. The two ends of the left and right guide shaft 7 are supported by concavities in the supporting member 15' and are also pressed against from above by a pressure plate 19'. A female screw plate 23 is embedded in the supporting member 15'. A screw 14' is screwed into that female screw plate 23. A dial 10' is secured to that screw 14' by a nut 18'. The outer circumference of that dial 10' is knurled. That dial 10' is attached to the front frame 1, so that it can freely turn, by a pressure plate 22' and a screw 21'. In other respects the configuration is the same as in the first embodiment.

In the configuration of the second embodiment described above, the display unit is attached and detached as follows.

When the dial 10' is turned in one direction, the screw 14' turns. Due to the turning of that screw 14', the female screw plate 23' separates from the screw 14'. Thereby, the supporting member 15' that is integral with the female screw plate 23, the covering lid 8, the pressure plate 19', the left and right guide shaft 7, the fore and aft guide plate 9, the up and down guide cover 4 that configures the fore and aft positioning concavities 13 that are mated to the fore and aft guide plate 9, and the display unit that is attached to the up and down guide cover 4 are detached as one unit from the holder. When attaching the display unit to the holder, the female screw plate 23' that is integral with the supporting member 15' is mated with the screw 14', and the dial 10' is turned in the opposite direction as it was during detachment.

The configuration wherewith the display unit is attached to and detached from the holder without using tools is not limited to one using a dial as described above. The display unit can also be linked via a spring to the holder, for example.

Figure 7:
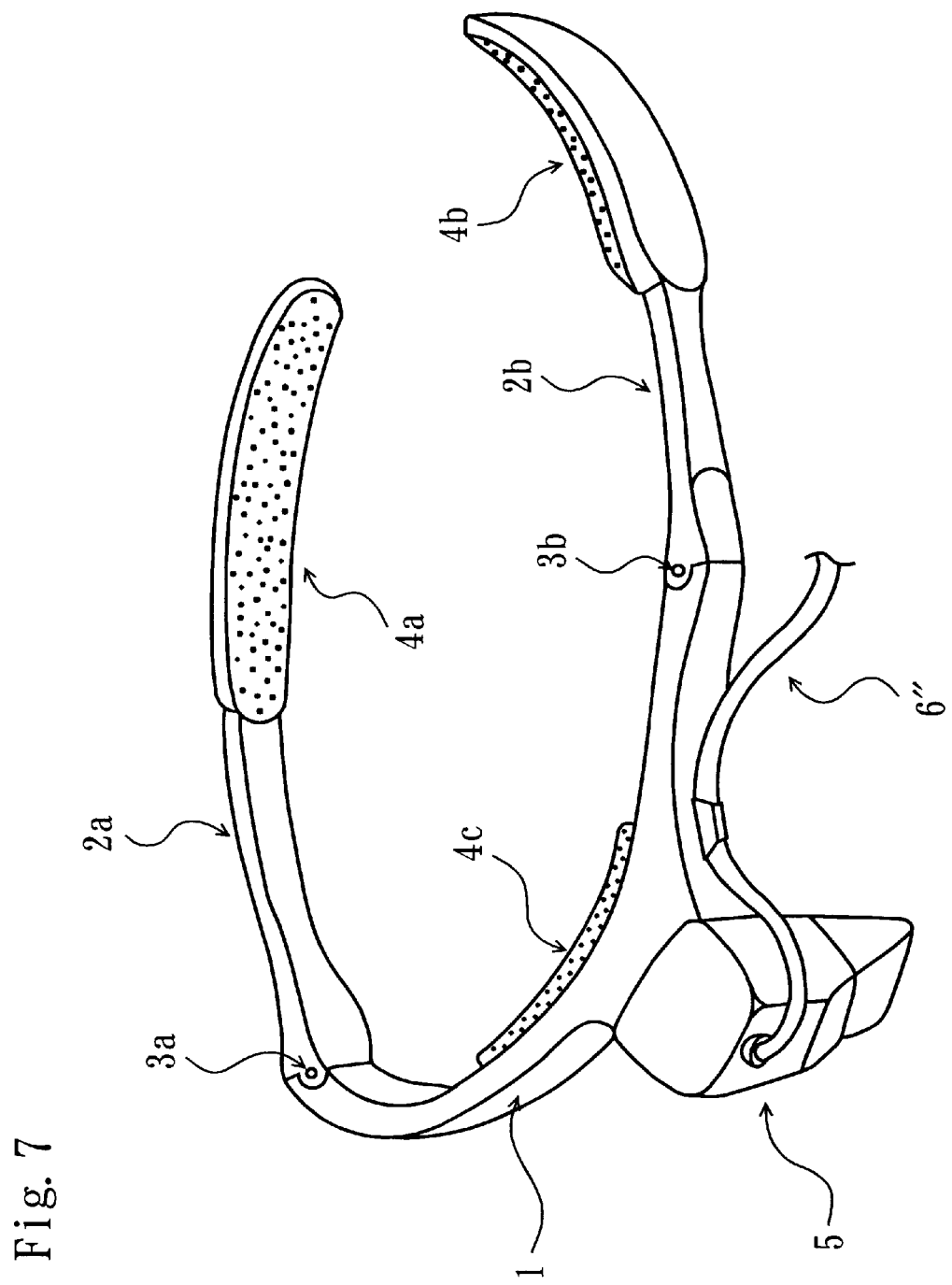
FIG. 7 is a diagonal view of a head-mounted display device in a third embodiment of the present invention.

FIG. 7 and FIG. 8 represent a head-mounted display device in a third embodiment of the present invention. Parts that are the same as in the first embodiment are indicated by the same symbols, and only the points of difference are described.

In this third embodiment, pads 4c, 4a, and 4b are attached as head protecting members to the front frame 1 and the side frames 2a and 2b. The pad 4c contacts the part of the forehead containing the eyebrows when the device is mounted on the head. The material of which the pads 4c, 4a, and 4b is made can be any material exhibiting an elastic force, such as a urethane sponge, elastomer, or rubber. In order to enhance the sense of fit when the holder is mounted on the head, it is preferable that the curvature of the front frame 1 be R=60 to 90 mm, that the curvature of the side frames 2a and 2b near where the pads 4a and 4b are attached be R=70 to 120 mm, and that the overall frame have a nearly elliptical shape. Item 6" is a cable for sending signals to the interior of the display unit 5. That cable 6" is not limited to one that comes out from the front of the display unit 5, but the structure can be made such that space is provided in the interior of a guide 1a" and in the interior of the front frame 1, and the cable 6" is wired internally. The pads 4a and 4b can be integral with the side frames 2a and 2b, respectively. Further, instead of having pads, the side frames 2a and 2b can have a rubber coating applied thereto or be covered by rubber covers.

In FIG. 8, joining parts for the display unit 5 and the front frame 1 are diagrammed. A guide 1a" formed in the front frame 1 is inserted into an opening 5a" formed in the display unit 5, whereby the display unit 5 and the front frame 1 are joined. The display unit 5 is able to slide forward and backward using the guide 1a". A mechanism for preventing pullout during fore and aft sliding can be provided in the interior of the display unit 5 and in the guide 1a", and that pullout prevention mechanism can be one structured so that the pullout prevention can be turned on and off by a switch or the like. Furthermore, the guide 1a" need not have a structure that is integral with the front frame 1, and a structure is permissible wherewith the display unit 5 is attached to the front frame 1 in a structure such that it can turn about an axis oriented in the direction in which the guide 1a" protrudes. In that case, the display device unit 5 can turn about an axis oriented in the direction in which the guide 1a" protrudes, wherefore this turning structure can be effectively utilized when inverting the display unit 5 relative to the holder. In other respects the configuration is the same as in the first embodiment.

According to the configuration described in the foregoing, when the holder is mounted so that the pad 4c on the front frame 1 contacts the forehead of the user, and so that the pads 4a and 4b on the side frames 2a and 2b contact the sides of the head of the user, the display unit 5 is in a condition wherein it is suspended from near the eyebrow of the user. Thus the display unit 5 can be brought close to the eyeball while maintaining stable holding with little blockage of the field of view. Accordingly, a suitable visual field angle can be secured even if that display unit 5 is small. Furthermore, by releasing the display unit 5 from the guide 1a", inverting the display unit 5, and then reattaching it to the guide 1a", and then mounting the holder to the head after inverting it, the display unit 5 can be switched between a position where it is used with the left eye and a position where it is used with the right eye.

The present invention is not limited to the embodiments or modification example described in the foregoing. For example, a supporter can be used that connects the side frames 2a and 2b at the back of the head in order to realize holding forces in the head holding holder behind the sides of the head. Earphones can also be held by the front frame 1 or the side frames 2a and 2b. Nor is the optical system limited to the configuration diagrammed in FIG. 3, but can for example incorporate a scheme wherein light emitted from a display element is reflected by a single combiner.

What is claimed is:

1. A head-mounted display device comprising:
   a head holding holder that is proximate at least to both sides of a head and to a front of the head; and
   a display unit releasably connected to said holder at a position above either one of a left or a right eye, at the front of the head.

2. The head-mounted display device according to claim 1, wherein said holder has a front frame which is made laterally unsymmetrical so that the head holding forces of the holder is prevented from becoming unbalanced to left or right.

3. The head-mounted display device according to claim 1, wherein said holder is provided with a display unit holding guide; and said display unit is able to slide relative to said guide.

4. The head-mounted display device according to claim 1, wherein said holder is provided with a display unit holding guide; and said display unit can turn about an axis oriented in a direction in which said guide protrudes.

5. The head-mounted display device according to claim 1, wherein said holder is divided between a member proximate to one side of head, a member proximate to other side of head, and a member proximate to front of head; and hinge structures are provided between said member proximate to said one side of head and said member proximate to front of head, and between said member proximate to said other side of head and said member proximate to front of head.

6. The head-mounted display device according to claim 1, further comprising:
   left and right movement means, up and down movement means, and fore and aft movement means for adjustably moving said display unit left and right, up and down, and fore and aft, relative to said holder.

7. The head-mounted display device according to claim 1, comprising display unit attachment and detachment means for attaching and detaching said display unit to and from said holder without using tools.

8. A head-mounted display device, comprising:
   a head holding holder that is proximate at least to both sides of a head and to a front of the head
   a display unit deployed on said holder at a position over either a left or a right eye, at the front of the head, and
   a head protecting member on said holder at an area near the front of the head and/or at a part of an area extending from the sides of the head to the back of the head.

9. A head-mounted display device, comprising:
   a head holding holder that is proximate at least to both sides of a head and to a front of the head,
   a display unit deployed on said holder at a position over either on a left or a right eye at the front of the head, and
   left and right movement means, up and down movement means and fore and aft movement means for adjustably moving said display unit left and right, up and down, and fore and aft, relative to said holder, wherein said left and right movement means have a shaft-shaped guide structure; and display retraction means are provided for holding said display unit so that the display unit is turnable about a shaft of said shaft-shaped guide structure, or for holding said display unit so that the display unit is movable to left and right along the shaft of said shaft-shaped guide structure.

10. A head-mounted display device, comprising:
    a head holding holder that is proximate at least to both sides of a head and to a front of the head,
    a display unit deployed on said holder at a position over either on a left or a right eye at the front of the head, and
    left and right movement means, up and down movement means and fore and aft movement means for adjustably moving said display unit left and right, up and down, and fore and aft, relative to said holder, wherein said left and right movement means, up and down movement means, and fore and aft movement means have movement guidance mating parts, respectively; and said display unit has a play to move slightly relative to said holder in at least one of said movement guidance mating parts.

11. The head-mounted display device comprising:
    a head holding holder that is proximate at least to both sides of a head and to a front of the head,
    a display unit deployed on said holder at a position over either a left or a right eye, at the front of the head, and
    display unit attachment and detachment means having a dial capable of a turning manipulation, wherein said display unit is attached to and detached from said holder by turning manipulation of said dial.

12. A head-mounted display device comprising:
    a head holding holder that is proximate at least to both sides of a head and to a front of the head and
    a display unit deployed on said holder at a position over either a left or a right eye, at the front of the head,
    wherein parts for mutually joining said display unit and said holder each have a vertically symmetrical shape.

13. A head-mounted display device comprising:
    a head holding holder that is proximate at least to both sides of a head and to a front of the head; and
    a display unit releasably connected to said holder at a position above either one of a left or a right eye, at the front of the head, said display unit being attached to said holder so as to be invertable.

* * * * *